United States Patent [19]

Harding

[11] 4,098,699

[45] Jul. 4, 1978

[54] LOW TURBULENCE SETTLING TANK

[75] Inventor: Dukecal Jenner Harding, Jackson Point, Canada

[73] Assignee: Magna International Inc., Downsview, Canada

[21] Appl. No.: 750,489

[22] Filed: Dec. 14, 1976

[30] Foreign Application Priority Data

Dec. 18, 1975 [CA] Canada .................. 242059

[51] Int. Cl.$^2$ ........................................... B01D 21/18
[52] U.S. Cl. ................................................. 210/520
[58] Field of Search .................. 210/519, 520, 83, 525

[56] References Cited

U.S. PATENT DOCUMENTS

| | | | |
|---|---|---|---|
| 2,204,093 | 6/1940 | Mallory | 210/520 X |
| 3,025,966 | 3/1962 | Kivell | 210/520 |
| 3,036,715 | 5/1962 | Gould | 210/520 |
| 3,452,869 | 7/1969 | O'Neill | 210/520 X |
| 3,465,886 | 9/1969 | Pilarczyk | 210/520 |
| 3,525,439 | 8/1970 | Spragins | 210/520 |
| 3,722,698 | 3/1973 | Hampton | 210/525 |
| 4,022,696 | 5/1977 | Krofta | 210/520 |

*Primary Examiner*—William A. Cuchlinski, Jr.

*Attorney, Agent, or Firm*—Beveridge, DeGrandi, Kline & Lunsford

[57] ABSTRACT

The specification discloses a settling tank system adapted for low-turbulence settling of solids from water, said system comprising a circular tank for retention of water during settling, a radial boom provided at the level of the surface of the water for rotation around a central hub, means for rotating the boom, said boom having a leading edge and a trailing edge, said leading edge having a horizontal forwardly projecting shelf below the level of the water, said trailing edge having a horizontal rearwardly projecting shelf also below the level of the water, said leading edge shelf, trailing edge shelf and boom bottom presenting a smooth continuous surface for non-turbulent passage through the water, said trailing edge having a means for uniform and non-turbulent supply of solids-containing water to the length of the shelf at a volume rate equal to the rate of horizontal displacement of the forwardly moving boom, said leading edge having a means for uniform and non-turbulent removal of cleared water from the length of the shelf at a rate equal to the displacement of the forwardly moving boom.

9 Claims, 10 Drawing Figures

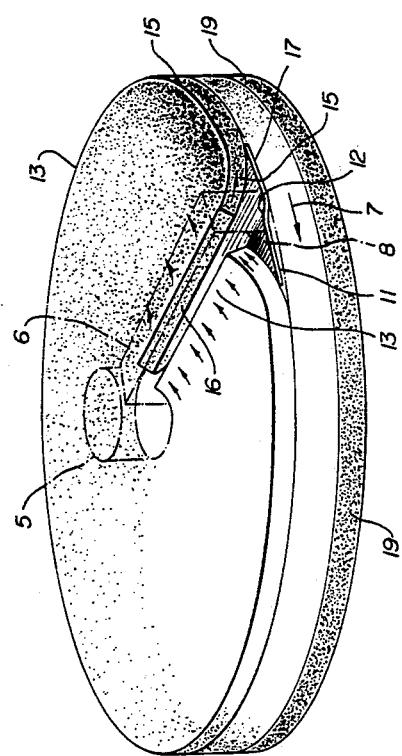
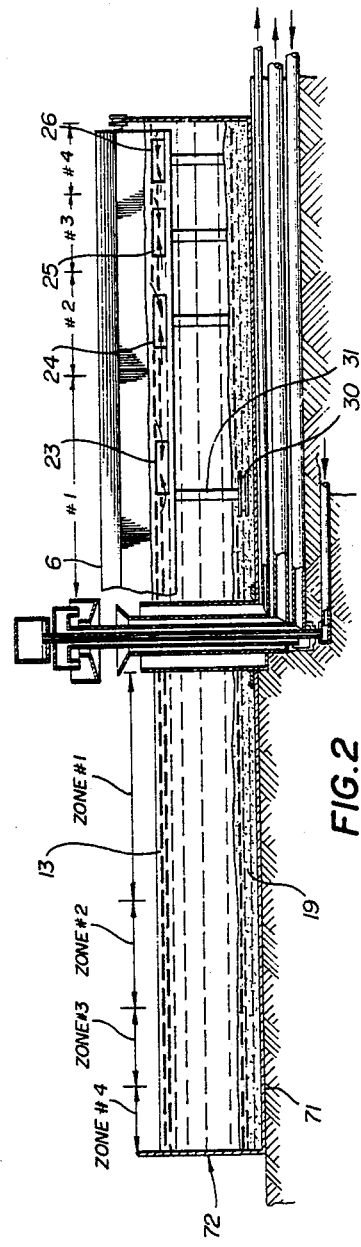
FIG. 1
FIG. 2

LOW TURBULENCE SETTLING TANK

DISCLOSURE

This invention relates to a settling tank adapted for low-turbulence settling of solids such as fine silt and clay from water. The settling tank of this invention is particularly useful for separating fine silt and clay from the watery effluent which is produced by a tar sands extraction process, and especially that process described in my co-pending U.S. Pat. Application No. 802,099 filed May 31, 1977, and which is a continuation-in-part of U.S. Ser. No. 542,985 filed Jan. 22, 1975.

Many devices are known in the prior art for facilitating the settling of such suspensions, but none appears to be suitable for removal of the very fine clay suspension resulting from extraction of oil from tar sands. In the extraction step a primary settling step is applied to the effluent, wherein the larger particles settle out relatively quickly. The remaining material is a fine suspension of clay particles which settle so slowly that it will not settle out at a satisfactory rate if there is a significant amount of turbulence. The previously used methods and apparatus involve considerable turbulence, since they generally involve considerable current flow from a solid suspension inlet to a clear water outlet. Thus the desirable downward flow of solids is seriously impaired by a flow, usually horizontal, of the mass of water. Such through-flow devices do not provide sufficient settling time and are otherwise unsuitable for the settling of the solids in any manner which involves continuous introduction of new suspension water. Thus the operator is required to use batch process and apparatus, involving many practical problems. If there is no provision for the removal of settled solids a batch tank will eventually become useless. If there is provision for intermittent removal of solids then this creates mechanical problems in developing techniques for the removal and disposal thereof.

In particular, by the use of a continuous process involving continuous removal of settled solids, it is possible to dispose of the solids through a system of re-inserting the solids into the extracted tar sands, from whence the tar sands loaded with the silt can be returned to the excavation site. This renders the present system very attractive in terms of permitting the continuous settling of clay water, the continuous removal of settled clay slurry, and continuous re-insertion of the clay slurry into the extracted tar sands.

Continuous operation of the separation process also makes possible recycling the water from extraction discharge back into the extraction step. This is obviously desirable since it avoids discharge of the effluent containing oil emulsions, finely divided clay and other pollutant into water courses. This also avoids the necessity for providing large storage ponds for the treatment of such water to enable it to be returned to a water course.

As antipollution laws and environmental considerations become more stringent this becomes a vital factor in the economics of the tar sands extraction process.

Thus it is an object of the present invention to provide a settling tank system enabling the absence of significant amount of horizontal fluid flow (which cause turbulence) within the settling area of the tank. This significantly shortens the residence time required for any given particle to fall through gravity a given distance.

By this method settling can be effected of particles having a relatively low terminal velocity, having regard to the skim depth and the cycle time in minutes.

The present invention therefore makes use of a settling tank system adapted for low turbulence settling of solids from water, said system comprising a tank of pond for retention of water during settling, a radial boom mounted at the level of the surface of the water for rotation around a central hub, means for rotating the boom, said boom having a leading edge and a trailing edge, said leading edge having a horizontal forwardly projecting shelf below the level of the water, said trailing edge having a horizontal rearwardly projecting shelf also below the level of the water, said leading edge shelf, trailing edge shelf and boom bottom presenting a smooth, streamline continuous surface for non-turbulent passage through the water, said boom having a means for uniform and non-turbulent supply of solids-containing water to the trailing edge of the boom at a volume rate substantially equal to the rate of horizontal displacement of the forwardly moving boom, and having means for uniform and non-turbulent removal of cleared water from the leading edge of the boom at a rate which is also substantially equal to the displacement of the forwardly moving boom.

The pond will typically be round, with a radius only slightly larger than the boom length.

Preferably the pond is equipped with a means for continuous pickup of settled sludge. This may for example be a radially disposed pickup means cooperating with the boom, or a sump provided with sludge pumping means. The rate of supply of solids-containing water should be equal to the rate of removal of cleared water sludge solids.

More specifically, the present invention provides, in the above system, an arrangement whereby the boom is divided into a plurality of sections with each section having metering means for non-turbulently supplying solids containing water to the trailing edge of the boom section at a metered volume flow rate substantially equal to the rate of horizontal displacement of the moving boom section, and each section having pumping means for non-tubulently removing cleared water from the leading edge of the boom section at a flow rate substantially equal to the rate of horizontal displacement of the boom section, said metering means comprising a rotor adapted to be driven by incoming solids-containing water at a speed proportional to the flow rate thereof, and said pump being coupled to said rotor to have a constant speed relationship thereto and being such as to remove the cleared water from the leading edge of the boom section at a flow rate proportional to the rotor speed.

It will be understood that the rate at which water is supplied to the trailing edge of a boom section will be slightly higher than the rate at which cleared water is removed from the leading edge, since the cleared water will have substantially no solids content. Thus, references to the rate of horizontal displacement of the moving boom section will be understood as referring to a different rate depending on whether the leading or trailing edge is being considered. The leading and trailing edges have different dimensions to accommodate this difference.

A further feature of this invention is that the boom may be made at least partially buoyant.

In the drawings which accompany this application

FIG. 1 is a schematic showing the behaviour and disposition of the various liquid layers involved in this operation.

FIG. 2 is a side elevation in partial section showing a settling tank and some component parts.

Figure 3:
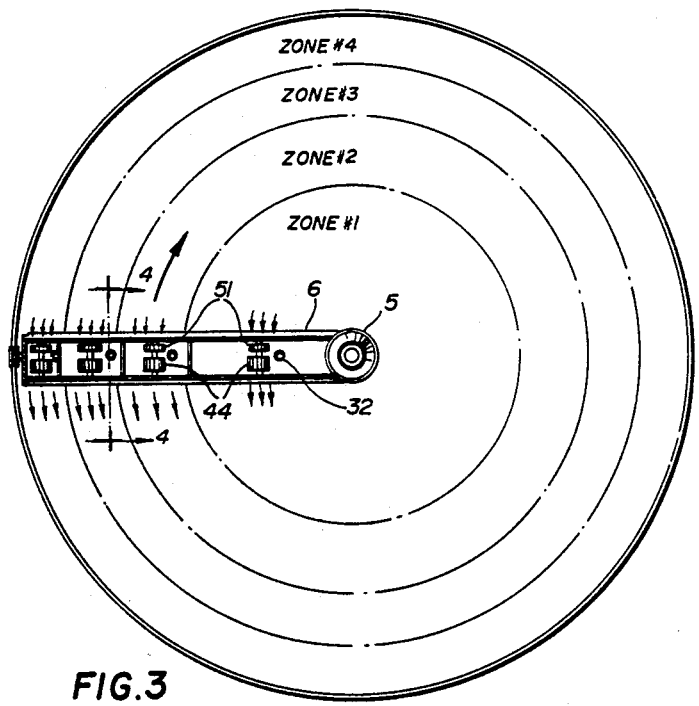
FIG. 3 is semi-schematic plan view showing some details of the boom hub and tank wall in an embodiment of this invention.

Referring to FIG. 1 there can be seen in schematic form a central hub 5 cooperating with radially extending boom 6. The boom is rotating in the clockwise direction as shown by the arrow 7. The leading edge 8 of the boom is moving towards the left in FIG. 1. A forwardly extending shelf 11 is continuous with the bottom 12 of the boom 6. A stationary layer of cleared water 13 is continuously separated from the bulk of the liquid by the movement of the self 11. The separated liquid 13 is continuously picked up by non-turbulent liquid pickup means in the boom 6. The trailing edge 15 of the boom 6 provides means for continuously laying down in a non-turbulent manner a layer 16 of clay-containing water, onto rearwardly extending shelf 17 which is continuous with the boom bottom 12. The rate of rotation of the boom 6 is set so as to permit adequate time for the clay to settle below the level of the boom bottom 12 so that it is beyond the reach of shelf 11 during the next rotation cycle of the boom. The clay solids settle quietly towards the bottom of the tank to collect as a sludge or slurry 19 at the bottom of the tank from which it can be continuously removed in association with the removal of the clear water layer 13.

FIG. 2 shows a typical apparatus giving effect to the factors mentioned in FIG. 1. Reference should also be made to FIG. 3. The tank is divided on a mathematical basis into four concentric zones of equal areas as shown each corresponding to one boom section. Each boom section is provided with clay water supply means 44 and cleared water pickup means 51. The apertures 23, 24, 25, 26, etc. should be so spaced apart and of such relative size as to provide an equal volume rate of flow into and out of the various zones and a means to distribute the flow on a swept area basis. Sludge pickup means for each boom section are provided as shown by flat pickup element 30 (referred to as a "duck foot"), the sludge rising through sludge pipe 31 and arriving at the boom 6 through apertures 76.

Figure 4:
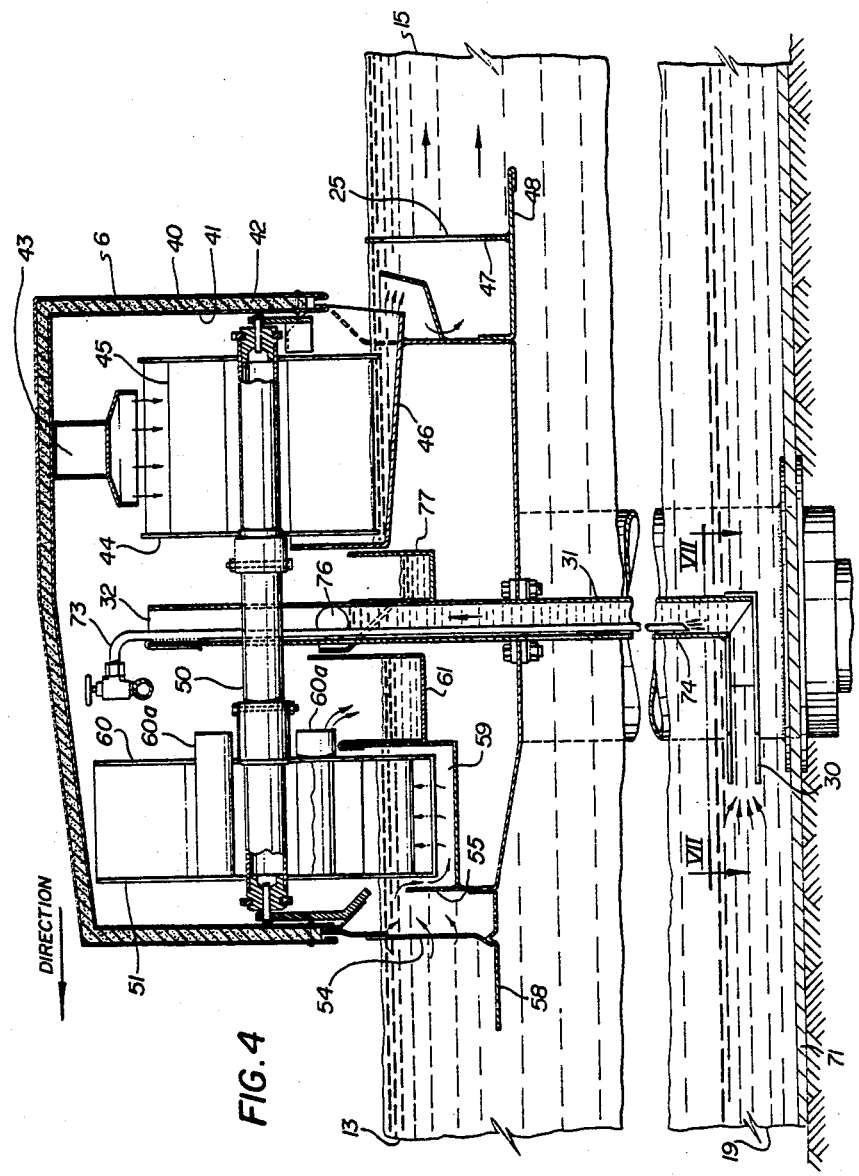
FIG. 4 is an end elevation of the boom shown in FIG. 3, showing some details and showing the relationship of the boom to water level and the tank bottom.
Figure 5:
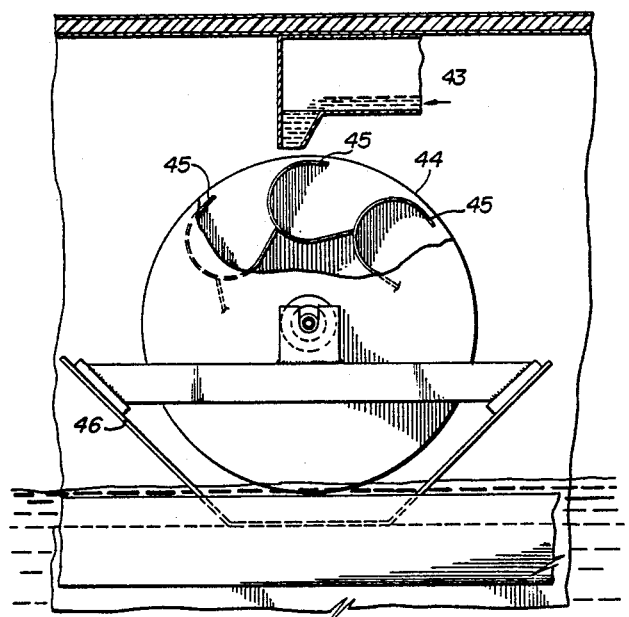
FIG. 5 shows a detail of a water wheel in the solid-containing water inlet area of the device.

FIG. 4 shows end elevation sectional view through section 4-4 of FIG. 3. Boom 6 consists of outer and inner layers 40 and 41, with polystyrene insulating layer 42 interposed between them. Clay water enters through passageway 43 and flows downwardly into buckets 45 of a water wheel 44 shown in FIGS. 4 and 5. The water turns the water wheel at a speed proportional to its flow rate and finds its way to the bottom trough 46 and through a series of baffles into distribution trough 47, finally leaving the trailing edge of boom 6 through apertures 23, 24, 25, 26, etc. The clay water thus is deposited gently and uniformly in the clay water layer 15 of the tank or pond, aided by shelf 48. As the clay water is deposited the boom 6 is moving in a clockwise direction (to the left in FIG. 4).

Figure 6:
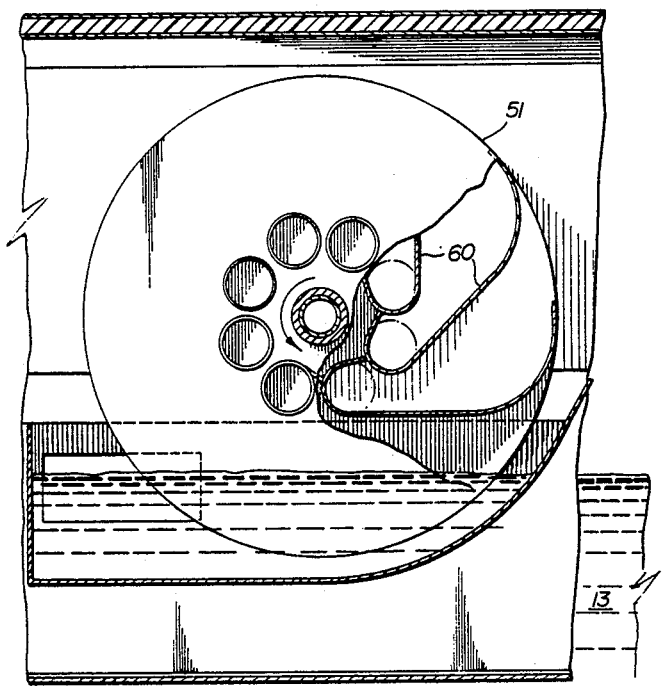
FIG. 6 shows the detail of a corresponding driven cleared water removal or pump.

Water wheel 44 is mounted on a shaft 50 which also carries a rotary pump 51 which, as shown in FIG. 6, has a series of scoops 60. Above shelf 58 passes through apertures 54 shown in FIGS. 4 and 6 and the passes over baffles 55 into pickup trough 59 from whence it is taken by pump scoops 60. These scoops move the water to an inner end thereof, from which the water flows horizontally through short tubes 60a into a collection trough 61 from which it is discharged into a clear water pickup system cooperating with the boom 6.

The water wheel 44 and connected driven pump 51 may be replaced by suitably controlled equivalent units of other types. However, in the form as shown, these items ensure that the delivery of water by the water wheel occurs at a rate proportional to the removal of water by the pump.

Figure 7:
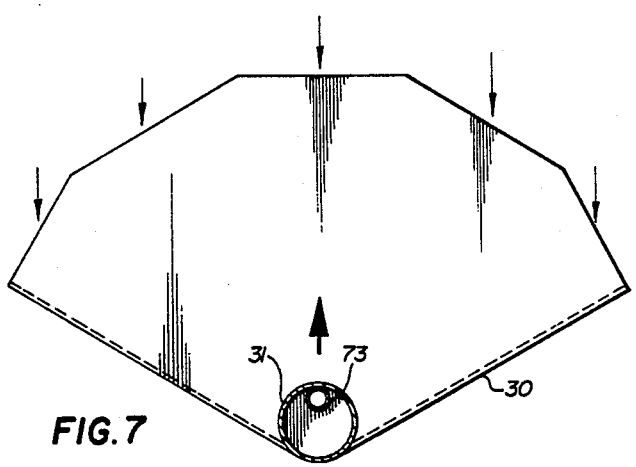
FIG. 7 shows a plan view of a settled solid slurry removal nozzle.

FIG. 7 shows a plan view of the duck foot sludge pickup unit 30, shown as a section through VII-VII in FIG. 4, which travels through sludge layer 19. The pickup is concentrated at a point below the top of the sludge layer but above the bottom 71 of the tank or pond 72. The sludge entering the duck foot unit is raised to the level of boom 6 by means of an air input means 73 providing a bubble lift effect through nozzle 74, the sludge moving upwardly through the sludge discharge removal pipe 31, to empty through aperture 76 into sludge trough 77 for removal along boom 6 the air leaving through the upper aperture 32 of the pipe 31.

Referring to FIG. 4, it will be seen that the bottom of boom 6 is smooth and continuous and generally horizontal so that water flows smoothly past leading edge shelf 58 along the bottom of the boom and past trailing edge shelf 48. Shelf 58 is slightly higher than shelf 48 and the difference is accounted for by the volume of clay sludge removed by duck foot or pickup nozzle 30.

Figure 8:
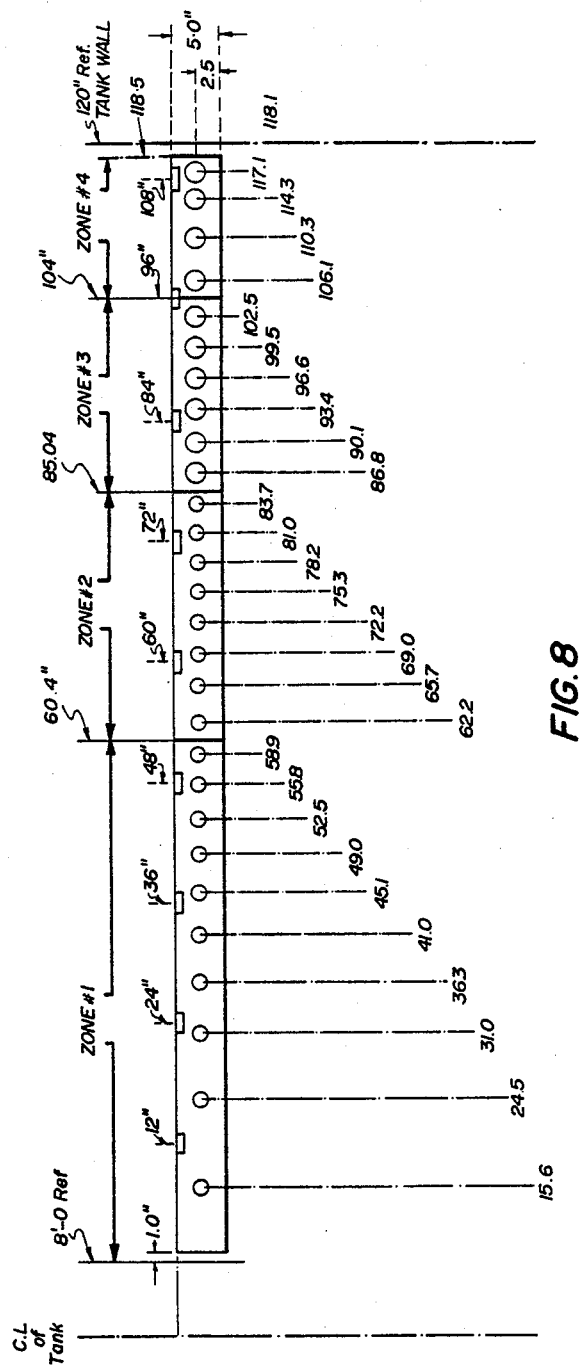
FIG. 8 is a side elevation of a distributor baffle plate for a settling tank.

FIG. 8 shows a distributor baffle plate suitable for use with a settling tank having a radius of ten feet. The baffle plate is just under ten feet in length. It is divided into four zones corresponding to the boom sections as referred to in FIGS. 2 and 3. In each zone there are apertures distributed there along, which are of a size and number to permit equal flow into or out of the boom distribution system for each zone, having regard to various factors, such as rotational velocity of that portion of the boom, and other factors. These apertures would replace the rectangular apertures, 23, 24, 25, & 26, shown schematically in wall 47 of FIGS. 2 & 4.

Figure 9:
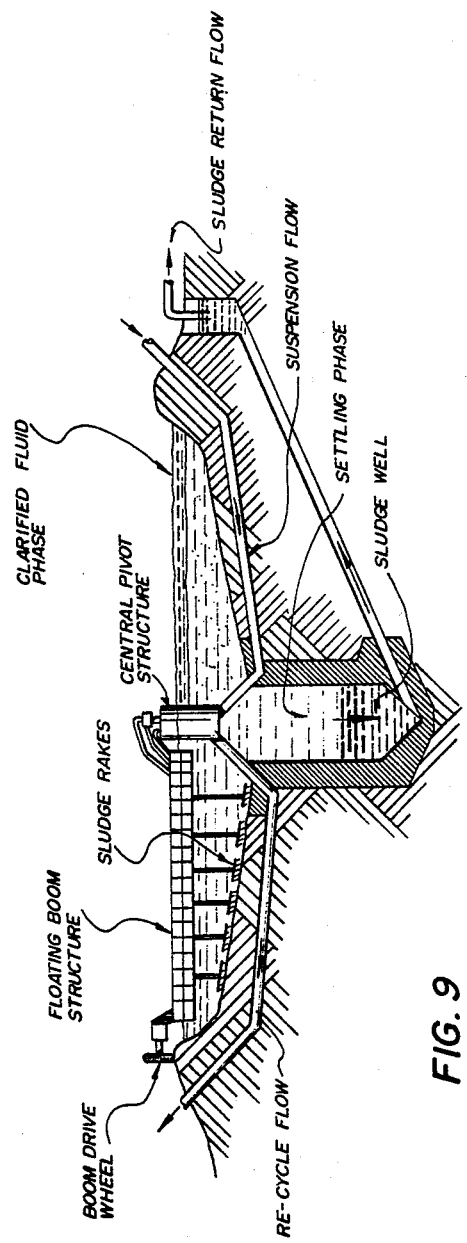
FIG. 9 is a schematic diagram showing an embodiment of the invention employing sludge rakes, urging the sludge downhill towards a central sludge well or sump.

FIG. 9 shows a schematic representation of an embodiment of the present invention in which settled sludge is urged by mechanical means towards a collecting point such as a sump from which it is pumped to provide the sludge return flow.

In the embodiment shown in FIG. 9, sludge rakes are provided which urge the sludge down an incline towards a sludge well. Such sludge rakes also have the useful function of gently disrupting water lenses and other such irregularities in the sludge layer.

In FIG. 9 the sump is centrally located with respect to the tank, which is an earthen pond rather than a walled tank shown in FIG. 2.

It appears to be practical to employ an earthen pond. The nature of the sludge is such that it promptly and completely seals the earth from any significant leakage by clay water. This lack of percolation has of course been one of the very serious problems hampering disposal of this sludge in the past. The tank may be built on existing earth surfaces with a dike or wall made from material excavated from the sump. Thus this embodiment employs an active sludge flow with a passive sludge pickup into the sump, instead of the passive sludge settling with active pickup by nozzles as shown in other embodiments. It may be noted that the boom incorporates a submerged cavity, below troughs 59, 61, 77 and 46, so that the boom is at least partly buoyant and does not need to be specially braced to spand a large radius.

The use of the present invention has demonstrated a highly efficient sludge concentration. For example, with a tewnty foot pressure head and one hundred hours residence time of clay water in the settling tank, the sludge has been found to reach a concentration of water to solids of as high as 1:2 or even 1:3. The sludge produced by the present settling tank, fed by clay water input from the rotary gravity separator disclosed in my co-pending U.S. patent application Ser. No. 802,099 has been found to have relatively few particles of less than 1 micron in size. Thus the combination of the rotary gravity separator together with primary effluent treatment therefrom and secondary treatment in the present settling tank is found to be highly desirable. It appears to be superior to the previously known hot water and caustic processes which appear to result in a high content of extremely fine clay particles.

Figure 10:
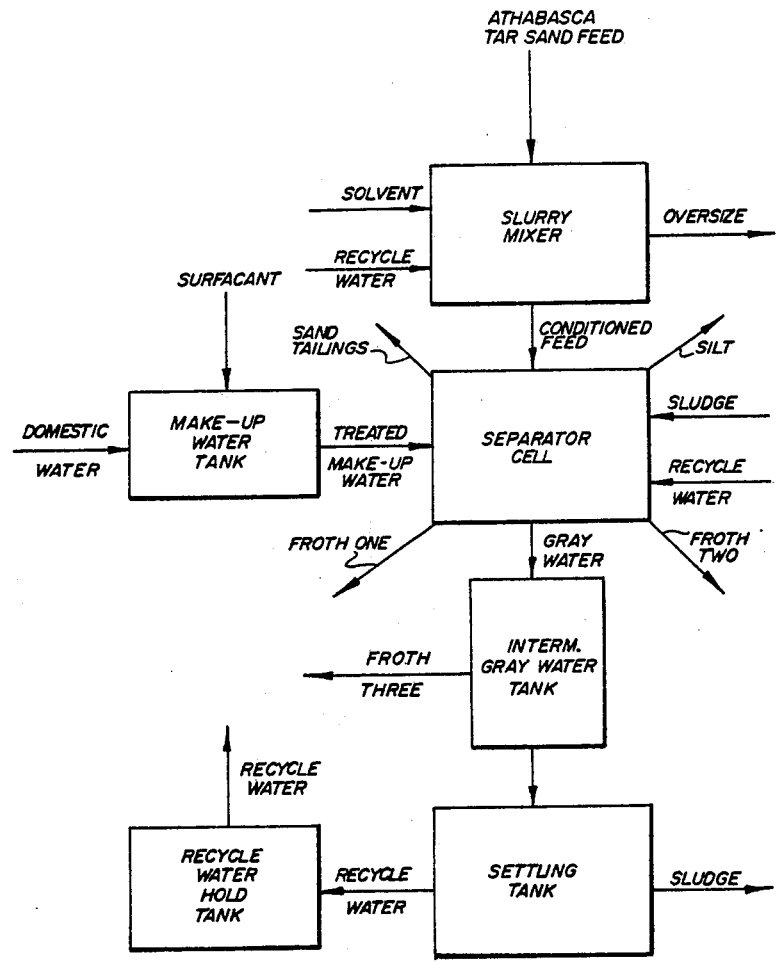
FIG. 10 is a block diagram of the overall separation system as discussed above.

FIG. 10 is a block diagram of the overall separation system as discussed above.

EXAMPLE 13,051 kilograms of typical tar sand feed stock at ambient temperature (76°–78° F) was used which consisted of the following proportions:

Bitumen — 10%
Water — 2%
Solids (sand, clay, etc.) — 88%

The process was carried out in a pilot plant apparatus. The results reported herein were taken over a period of 23½ hours. The tar sand material was mixed with water and passed through a slurry conditioning mill, where kerosene was added at 50% of the bitumen content by wt. then passed through an over-size reject step. The rejected material (8.75% of the total solids) consisted chiefly of unbroken clay lumps containing a small percentage of bitumen. This clay material was rejected because it is difficult to process. The resulting slurry was passed through a rotary gravity separator of the type disclosed in co-pending U.S. application Ser. No. 802,099 referred to above, resulting in the production of the majority of the bitumen and the withdrawal of a settled sand bed (78.475% by weight of the solids) consisting chiefly of coarse sand (63 to 500 microns or 0.063 to 0.5 mm). The water carry over was passed through some intermediate settling steps and then supplied to the low turbulence settling tank of the present invention. The process produced a relatively particle free (although still not completely clear) cleaned water output and a sludge sediment stream consisting chiefly of clay and silt particles of a size greater than 2 microns and less than 38 microns. Over the period of the test, 11,280 imperial gallons of water were handled, being processed through the settling tank and cleaned or clarified water recycled to the rotary separator. The sediment which resulted contained 8.55% of the solids content of the incoming tar sand, and consisted of 538.5 kilograms solids weight. This fine clay and silt sludge was suitable for disposal, or for reintroduction into the sand produced in the rotary separator previously mentioned.

Other objects of the invention and modifications of various components, other than those specifically set forth may become apparent to those of ordinary skill in the art. Accordingly, it is intended that this description be interpreted as illustrative and not in a limiting sense.

We claim:

1. A settling tank system adapted for low-turbulence settling of solids from water, said system comprising a tank for retention of water during settling, a radial boom mounted at the level of the surface of the water for rotation around a central hub, means for rotating the boom, said boom having a leading edge and a trailing edge, said leading edge having a horizontal forwardly projecting shelf below the level of the water, said trailing edge having a horizontal rearwardly projecting shelf also below the level of the water, said leading edge shelf, trailing edge shelf and boom bottom presenting a smooth, streamline continuous surface for non-turbulent passage through the water, said boom being divided into a plurality of sections with each section having metering means for non-turbulently supplying solids containing water to the trailing edge of said boom section at a metered volume flow rate substantially equal to the rate of horizontal displacement of the moving boom section, and each section having pumping means for non-turbulently removing cleared water from the leading edge of said boom section at a flow rate substantially equal to the rate of horizontal displacement of the boom section, said metering means comprising a rotor adapted to be driven by incoming solids-containing water at a speed proportional to the flow rate thereof, and said pump being coupled to said rotor to have a constant speed relationship thereto and such as to remove the cleared water from the leading edge of the boom section at a flow rate proportional to the rotor speed.

2. A system as in claim 1 wherein the tank is circular, with a radius only slightly larger than the radial boom length.

3. A system as in claim 2 wherein the boom is associated with a radially disposed means for continuous pickup of settled solids.

4. A system as in claim 3 wherein the rate of supply of solids-containing water is equal to the rate of removal of cleared water and solids.

5. A system as in claim 2 further comprising a means for collection and pickup of settled solids.

6. A settling tank system according to claim 1, wherein said rotor is in the form of a waterwheel having buckets which receive the incoming water from a supply in an upper part of the boom and deliver it to a lower part of the boom.

7. A settling tank according to claim 6, wherein said pump comprises a series of scoops disposed around an axis and capable of scooping water from the tank level into a water outlet conduit, and wherein said pump and said waterwheel are fixed to a common shaft co-axial therewith.

8. A settling tank according to claim 1, wherein the leading and trailing edges of the boom are provided with baffle means above said shelves through which water flows from the boom into the tank and from the tank into the boom.

9. A settling tank according to claim 1, wherein said boom includes a submerged cavity which is empty of liquid and which provides substantial buoyancy for the boom.

* * * * *